UNITED STATES PATENT OFFICE.

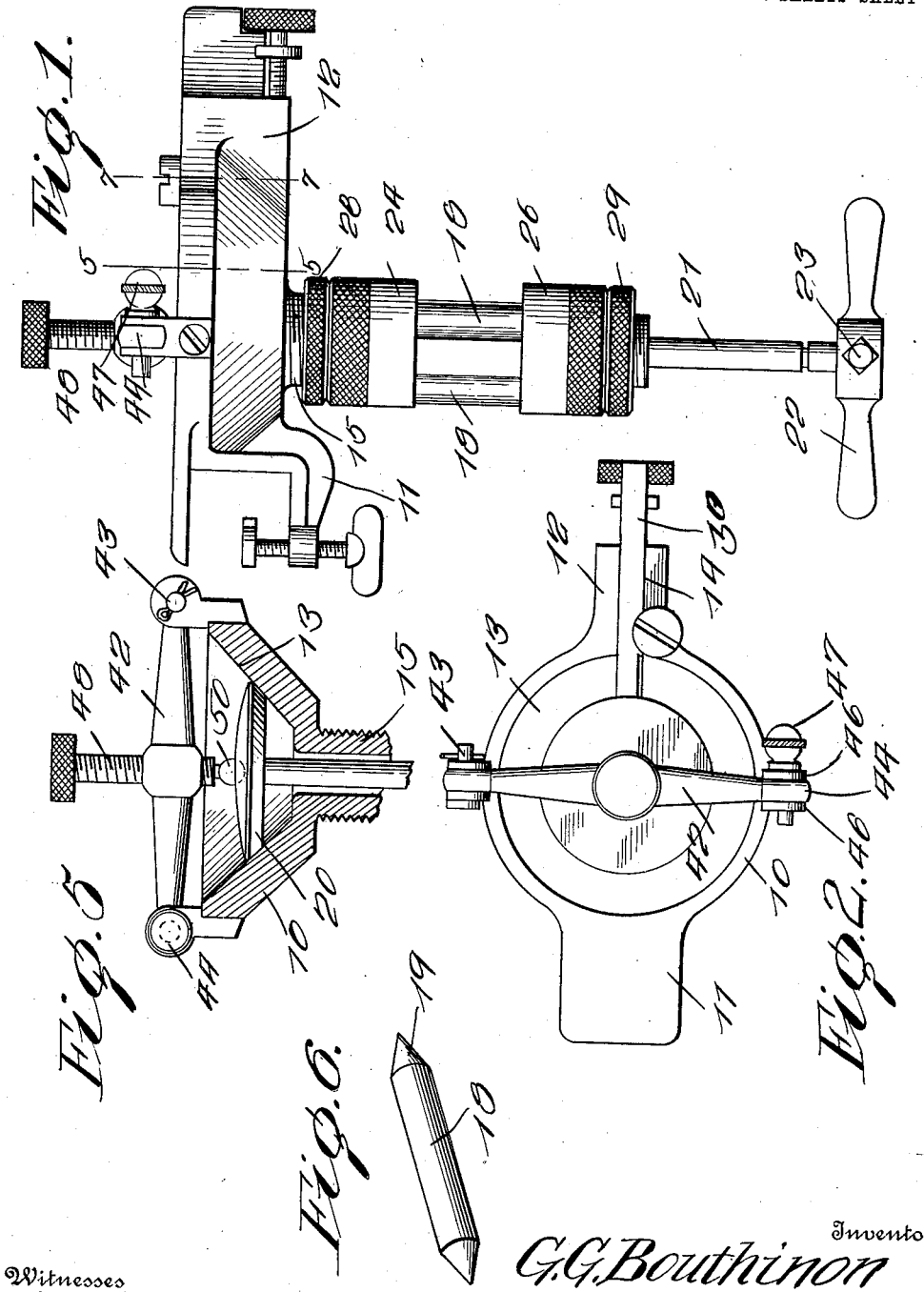

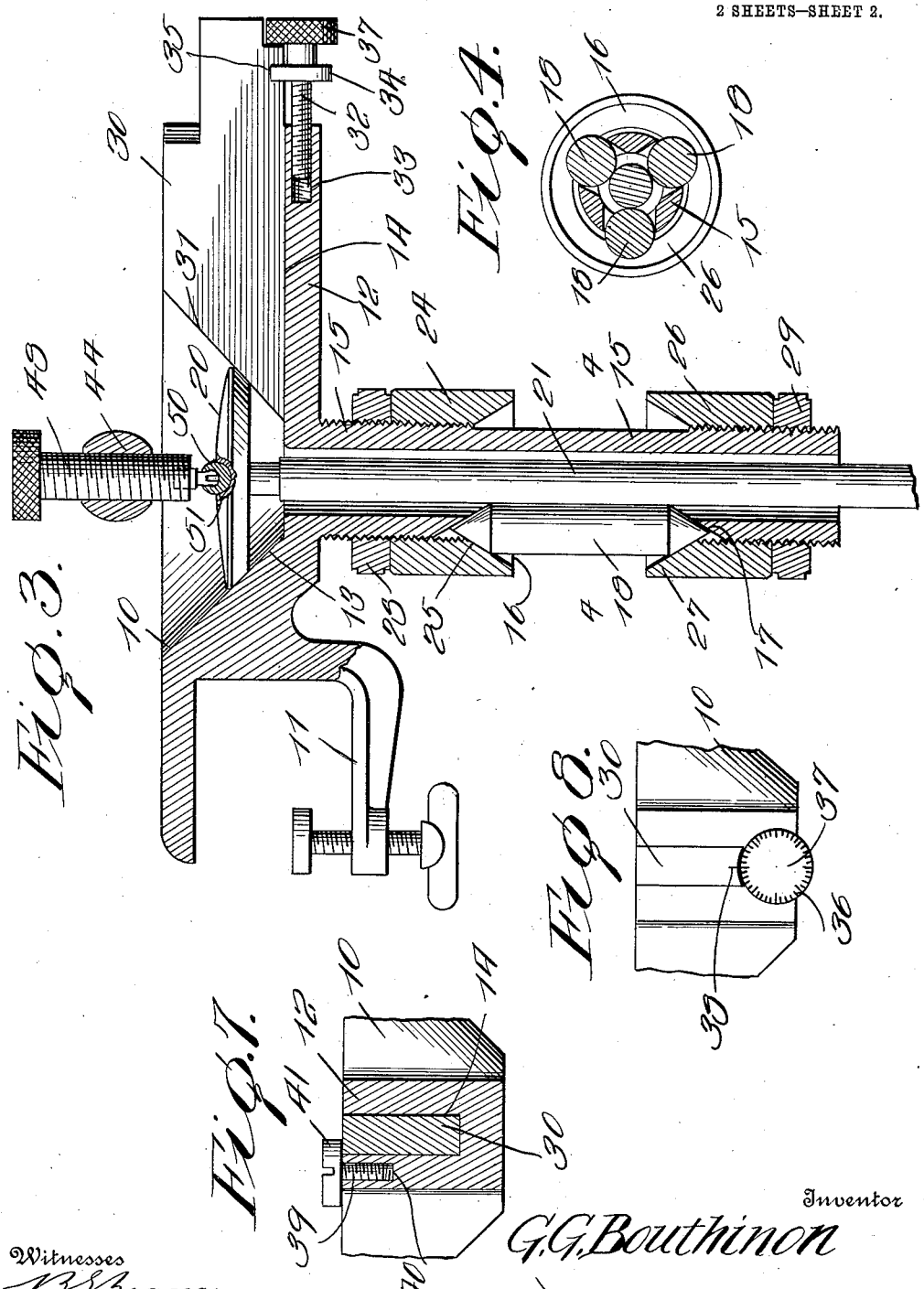

GEORGE G. BOUTHINON, OF HEMPSTEAD, NEW YORK, ASSIGNOR TO G. B. GARAGE COMPANY, OF HEMPSTEAD, NEW YORK.

VALVE-TRUING DEVICE.

1,097,841.

Specification of Letters Patent.

Patented May 26, 1914.

Application filed October 29, 1912. Serial No. 728,501.

*To all whom it may concern:*

Be it known that I, GEORGE G. BOUTHINON, a citizen of the United States, residing at Hempstead, Long Island, in the county of Nassau, State of New York, have invented certain new and useful Improvements in Valve-Truing Devices; and I do hereby declare the following to be a full, clear, and exact description of the invention, such as will enable others skilled in the art to which it appertains to make and use the same.

This invention relates to valve shapers and has for an object to provide a device of this character having a holder equipped with novel roller bearings for holding the valve stem in position to center the valve in the holder head, these bearings serving to straighten the valve stem if bent, during the valve grinding operation.

With the above objects in view the invention consists of certain novel details of construction and combination of parts hereinafter fully described and claimed, it being understood that various modifications may be made in the minor details of construction within the scope of the appended claims.

In the accompanying drawings forming part of this specification:—Figure 1 is a side elevation of my improved valve shaper applied to a valve. Fig. 2 is a plan view of the parts shown in Fig. 1. Fig. 3 is a vertical longitudinal sectional view through the valve shaper. Fig. 4 is a cross sectional view taken on the line 4—4 Fig. 3. Fig. 5 is a fragmentary longitudinal sectional view taken on the line 5—5 Fig. 1. Fig. 6 is a detail perspective view of one of the roller bearings. Fig. 7 is a fragmentary sectional view taken on the line 7—7 Fig. 1. Fig. 8 is an end view showing the shaping tool adjusting screw and scale.

Referring now to the drawings in which like characters of reference designate similar parts, the holder comprises a head 10 having an attaching clamp 11 on one side and having a lug 12 diametrically opposite the clamp, there being a conical recess 13 formed in the head and a slot 14 formed in the lug which communicates with the recess. The head is equipped with an integral axial tubular stem 15 which is provided in the side with longitudinal slots 16 preferably three in number which communicate with the bore of the stem, each slot being formed with the opposite end walls beveled as shown at 17 Fig. 3. In each slot is disposed a roller bearing 18 having conical ends 19 which bear upon the beveled end wall 17 of the slot, the roller bearing being of such thickness as to extend into the bore of the stem and also beyond the outer wall of the stem as shown in Figs. 3 and 4.

The valve 20 to be shaped is inserted in the conical recess 13 of the head with the stem 21 projecting through the bore of the holder stem 15 and bearing upon the roller bearings 18, the end of the valve stem projecting below the holder stem and being terminally equipped with a hand wheel 22 which is fixed to the valve stem by means of a set screw 23 and forms means for rotating the valve during the shaping operation. The roller bearings center the valve stem so that the valve bears with the conical edge snugly against the conical wall of the recess 13.

For retaining the roller bearings in position a sleeve 24 is threaded on to the holder stem 15 and is provided with a beveled lower edge 25 that bears upon the conical upper ends of the roller bearings, and a second sleeve 26 is threaded on to the holder stem and is provided with a beveled upper edge 27 that bears upon the conical lower ends of the roller bearings. A lock nut 28 is threaded on to the holder above the sleeve 24 and is advanced into engagement with the sleeve to lock the latter in position. A lock nut 29 is threaded on to the holder stem below the sleeve 26 and is advanced into engagement with the sleeve to lock the same in position.

The shaping tool 30 is in the nature of a bar which is slidably fitted in the slot 14 of the lug 12 and is provided with a beveled cutting edge 31 which conforms to the contour of the recess 13 in the holder head. An adjusting screw 32 is threaded into an opening 33 formed in the end face of the lug 12 and is provided with a collar 34 which engages in a groove 35 formed in the lower edge of the shaping tool. Upon manipulation of this adjusting screw the grinding tool will be advanced into or retracted from the recess 13 in the usual manner. A circular scale 36 is formed on the adjusting screw head 37 and a line 38 is arranged centrally on the end edge of the shaping tool, this line registering with the various division lines of the scale during manipulation of the adjusting screw and denoting the extent of such manipulation.

For locking the shaping tool in any adjusted position, a screw 39 is threaded into an opening 40 formed in the top face of the lug 12, the head 41 of this screw lapping over the top edge of the shaping tool which is flush with the top face of the lug, and clamping the shaping tool fast to the bottom of the slot 14.

For clamping the valve in the holder recess, a clamp arm 42 is hinged at one end as shown at 43 on the holder head 10 and is provided at the opposite end with an eye 44 through which and openings 45 formed in lugs 46 carried by the holder head a pintle 47 is passed. A clamping screw 48 is threaded through an opening 49 formed at the center of the arm, the clamping screw being terminally equipped with a swivel ball 50 which engages in the depression 51 that is formed at the center of the head of ordinary valves.

What is claimed, is:—

1. A valve shaper including a head having a valve receiving recess, a shaping tool carried by said head and adapted to enter said recess, an axial tubular stem on said head adapted to receive a valve stem and having a plurality of longitudinal slots in the periphery, each slot terminating in beveled end walls, a roller bearing in each slot having conical ends bearing upon said beveled end walls, each bearing being of such diameter as to project into the bore of said stem and exteriorly beyond said stem, and spaced retaining sleeves on said stem having their opposing edges beveled and fitting against opposite ends of said roller bearings.

2. A valve truing device including a head having a valve receiving recess, an axial tubular stem on said head adapted to receive a valve stem, and means carried by said tubular stem to center and straighten a valve stem inserted in the tubular stem, said means including elongated members carried by the tubular stem and movable radially thereof, said members being adapted to engage on a valve stem when in the tubular stem, and element arranged to force the elongated members inwardly.

3. A valve truing device including a head having a valve receiving recess, an axial tubular stem on said head adapted to receive a valve stem and having a plurality of longitudinal slots in its periphery, a roller mounted on each slot, and means to cause said rollers to move radially of the tubular stem whereby the valve stem mounted in the tubular stem is centered and straightened.

4. In a valve truing device, a head having a valve receiving recess, a shaping tool carried by said head and adapted to enter said recess, an arm pivoted to said head at one end and detachably connected to the head at the remaining end, a set screw extending through said arm axially of the head and adapted to bear against the center of a valve held in said head.

In testimony whereof, I affix my signature, in the presence of two witnesses.

GEORGE G. BOUTHINON.

Witnesses:
GEORGE T. BOWDREN,
GEO. H. BAUKNEY.

---

Copies of this patent may be obtained for five cents each, by addressing the "Commissioner of Patents, Washington, D. C."